United States Patent
Betts et al.

(10) Patent No.: US 6,421,299 B1
(45) Date of Patent: Jul. 16, 2002

(54) SINGLE-TRANSMIT, DUAL-RECEIVE SONAR

(75) Inventors: David A. Betts; Louis Loving, both of Eufaula, AL (US)

(73) Assignee: Techsonic Industries, Inc., Eufaula, AL (US)

( * ) Notice: Subject to any disclaimer, the term of this patent is extended or adjusted under 35 U.S.C. 154(b) by 0 days.

(21) Appl. No.: 09/605,620

(22) Filed: Jun. 28, 2000

(51) Int. Cl.[7] .......................... G01S 15/96; G01S 15/66
(52) U.S. Cl. .......................... 367/105; 367/87; 367/107
(58) Field of Search .......................... 367/88, 87, 99, 367/103, 105, 107, 910

(56) References Cited

U.S. PATENT DOCUMENTS

| | | | | |
|---|---|---|---|---|
| 3,585,578 A | * | 6/1971 | Fischer, Jr. | 367/88 |
| 4,081,783 A | * | 3/1978 | Honda | 367/101 |
| 4,084,150 A | * | 4/1978 | Massa | 367/155 |
| 4,121,190 A | * | 10/1978 | Edgerton et al. | 367/106 |
| 4,809,242 A | | 2/1989 | Oka et al. | 367/113 |
| 4,829,492 A | | 5/1989 | Choi et al. | 367/110 |
| 4,829,493 A | | 5/1989 | Bailey | 367/111 |
| 4,837,750 A | | 6/1989 | Saunders | 367/111 |
| 4,879,697 A | | 11/1989 | Lowrance | 367/111 |
| 4,935,906 A | | 6/1990 | Baker et al. | 367/111 |
| 4,943,951 A | | 7/1990 | Leavell et al. | 367/111 |
| 4,958,330 A | * | 9/1990 | Higgins | 367/88 |
| 4,988,996 A | | 1/1991 | Ito | 340/984 |
| 5,043,727 A | | 8/1991 | Ito | 340/984 |
| 5,065,371 A | | 11/1991 | Leavell et al. | 367/111 |
| 5,127,352 A | | 7/1992 | Kulpa | 114/144 E |
| 5,537,380 A | | 7/1996 | Sprankle, Jr. et al. | 367/111 |
| 5,594,707 A | | 1/1997 | Goto et al. | 367/111 |
| 5,805,528 A | | 9/1998 | Hamada et al. | 367/111 |

* cited by examiner

*Primary Examiner*—Ian J. Lobo
(74) *Attorney, Agent, or Firm*—Baker, Donelson, Bearman & Caldwell

(57) ABSTRACT

An apparatus and method for scanning a body of water for fish and other underwater articles with a sonar depth finder of a type having a transducer that can transmit an acoustic wave and receive sonar returns on both a narrow acoustic wave beam mode and on a wide acoustic wave beam mode, in which the sonar depth finder repetitively determines the approximate depth of the body of water by repetitively transmitting in the wide beam mode and receiving and displaying the sonar returns from each transmission initially in the wide beam mode and then in the narrow beam mode, with the duration of receiving in the narrow acoustic wave beam mode being a function of the determined depth from a prior transmission.

11 Claims, 2 Drawing Sheets

SINGLE-TRANSMIT, DUAL-RECEIVE SONAR

The present invention relates to marine sonar depth detectors. More particularly, the present invention relates to sonar depth detectors providing propagation of wide beams in bodies of water with selective receiving of return echoes in a wide beam mode and a narrow beam mode for each transmission of the wide beam.

BACKGROUND OF THE INVENTION

Sonar devices which transmit sound waves have been used previously in marine vessels for scanning bodies of water to obtain information about underwater articles, including fish, structures and obstructions, and the bottom. The sound waves travel from a transducer mounted to a bottom surface of the vessel through the water. The sound wave transmits from the sonar devices in conical patterns. The sound waves contact underwater articles which create return echoes. The transducer receives the return echoes and the sonar device analyzes the received echoes. A display device displays representations of the received echoes, for locating fish and other underwater articles.

The size of the cone created by the transmitted acoustic beam affects the quality of the return echo and thus the quality of the imaging of subsurface articles displayed by the sonar device. Generally, a wide beam provides diffused return echoes that are particularly suited for indicating the presence of fish in a wide area around the vessel. The signal displayed for fish is referred to as a "fish arch". A narrow beam on the other hand provides a more detailed return echo or signal representative of the subsurface article. The narrow beam covers a smaller area but provides additional definition of the article. The wide beam accordingly is useful for providing indications of the presence of schools of fish in a wide area around the vessel as well as other underwater articles. The narrow beam is useful for providing details of the underwater article or the bottom.

The transmission of an acoustic wave beam and the reception of reflected echoes are a transmit/receive cycle, which is referred to herein as a T/R cycle. The acoustic wave beam travels from the transducer, typically mounted on the bottom of the vessel, to the bottom of the body of water, and reflects back to the transducer which receives the reflected echoes of the acoustic wave beam. The duration of the T/R cycle depends on the depth of the water. Typically, the T/R cycles of transmission and reception are two to four times per second for deep water and more frequently, such as one-thirtieth of a second, for shallower waters.

Sonar devices heretofore have provided switches for the operator to select manually either the wide beam or the narrow beam to transmit and receive for scanning a body of water for underwater articles. Another type of sonar device alternates the T/R cycles of transmitting and receiving the sound waves between the narrow acoustic wave beam and the wide acoustic wave beam, using conventional rings and discs in the transducers. Thus, the transducer first transmits the wide beam and receives the wide return echo. The transducer than transmits the narrow beam and receives the narrow return echo.

While these sonar depth detectors provide information about underwater articles, there are drawbacks to their use. For sonar depth detectors with manually selected beams, the information displayed is limited. In wide beam mode, the area covered is larger, but details are not clear. This is appropriate for locating fish, but generally not for bottom definition. Narrow beam images are of a smaller area, and are useful for bottom definition, such as when traveling into a shore area. With the sonar depth detectors of the type transmitting alternating wide and narrow acoustic wave beams, the vessel continues to move through the water. While the vessel travels, some aspects of information may not be obtained, due to the sonar depth detector alternating the transmission of the beams.

Accordingly, there is a need in the art for an improved depth detector apparatus and method of propagating sonar beams and receiving sonar returns for obtaining more accurate information about underwater articles. It is to such that the present invention is directed.

SUMMARY OF THE PRESENT INVENTION

The present invention meets the need in the art by providing a single-transmit, dual-receive sonar depth detector device, comprising a transducer for transmitting in a single transmit/receive cycle a wide acoustic wave beam and for receiving sonar returns on both a narrow acoustic wave beam mode and a wide acoustic wave beam mode. A switch changes the receiving mode of the transducer from the initial wide acoustic wave beam mode following the transmission to the narrow acoustic wave beam mode, with the duration of receiving in the narrow acoustic wave beam mode being a function of the determined depth from a prior transmission. A display displays the sonar returns from each transmission.

In another aspect, the present invention provides a method of scanning a body of water for fish and other underwater articles with a sonar depth finder of a type having a transducer that can transmit an acoustic wave and receive sonar returns on both a narrow acoustic wave beam mode and on a wide acoustic wave beam mode, and which comprises the steps of repetitively determining the approximate depth of the body of water by repetitively transmitting in the wide beam mode and receiving and displaying the sonar returns from each transmission initially in the wide beam mode and then in the narrow beam mode, with the duration of receiving in the narrow acoustic narrow beam mode being a function of the determined depth from a prior transmission.

Objects, features, and advantages of the present invention will become apparent from a reading of the following specifications, in conjunction with the drawings and the appended claims.

DETAILED DESCRIPTION OF THE PREFERRED EMBODIMENT

Figure 1:
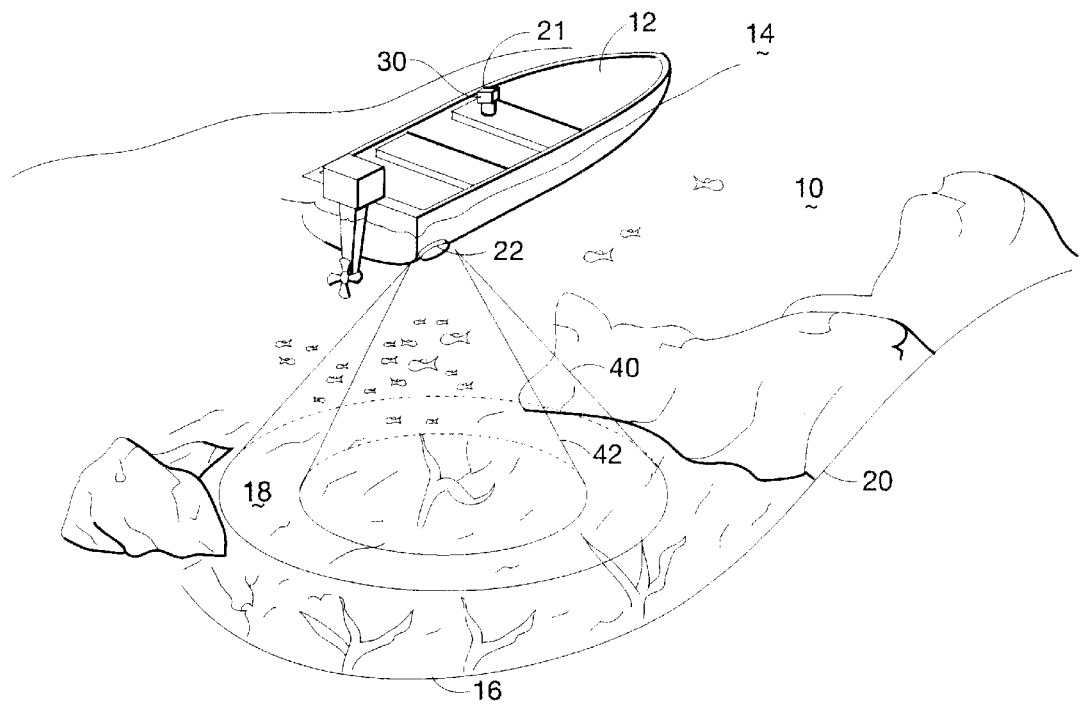
FIG. 1 is a perspective view of a body of water with a vessel having a sonar depth detector according to the present invention.
Figure 2:
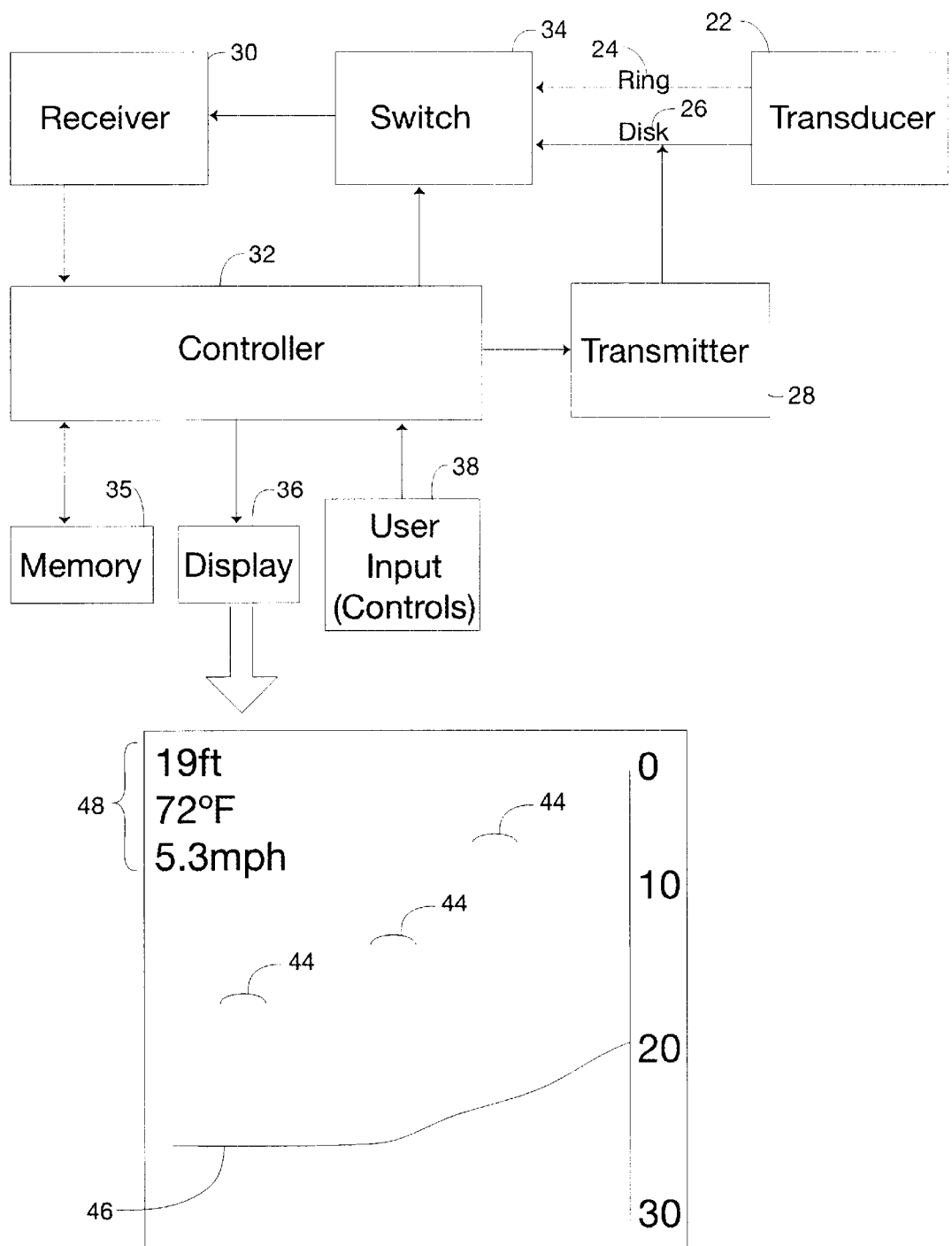
FIG. 2 is a schematic illustration of the sonar depth detector according to the present invention.

Referring now in more detail to the drawings, in which like numerals indicate like parts throughout the several views, FIG. 1 illustrates a body of water 10 with a vessel 12 on a surface 14 and a bottom generally 16. The bottom 16 is illustrated with a planar area 18 and a sloping surface 20. The vessel 12 includes a sonar device 21 having a transducer 22 mounted to a bottom surface of the vessel. With additional reference to FIG. 2, the transducer 22 includes a ring 24 and a disc 26 for acoustic wave transmitting and receiving through a transmitter 28 and a receiver 30 which are operated by a controller 32. A switch 34 selectively connects the ring 24 and the disc 26 for receiving sonar returns in the wide mode and the narrow mode in accordance with the present invention, for scanning the body of water 10, particularly for locating fish, as well as other underwater articles, and determining characteristics about the bottom 16 of the body of water. The controller 32 includes a memory 35 and communicates with a display 36. User-selected controls 38 provide for custom operation of the sonar device 21, including selecting automatic or manual depth scale, display characteristics such as brightness or contrast, information display such as water temperature and vessel speed, which controls are conventional in the art.

The acoustic wave beams are transmitted in a wide sonar beam and reflected echoes are received in a wide sonar beam mode 40 and in a narrow sonar beam mode generally 42. The controller 32 communicates with the display 36 to show images representative of the received return echoes of the acoustic wave beams. These images include fish arches 44, a bottom profile 46, and selected informational subject matter generally 48 (that in the illustrated embodiment includes the depth, the water temperature, and the velocity of the vessel) depending on the user preferences input with the controls 38.

The switch 34 causes the sonar device 21 to receive in the wide beam mode 40 or the narrow beam mode 42. The switch 34 changes the receiving mode based on a proportion of the duration of the acoustic wave beam traveling from the transducer to the bottom 16 and returning as sonar returns for being received by the receiver. The depth data from a prior T/R cycle is used as an approximation of the depth for determining the duration of receiving the return echoes in the wide beam mode 40 or the narrow beam mode 42 during the single T/R cycle operation of the sonar device 21, as discussed below. The depth data is preferably the depth determined during the preceding T/R cycle. In the absence of depth data, the controller 32 operates the switch 34 for the receiver to receive in the wide beam mode 40 during each T/R cycle, until a depth is determined.

Figure 3:
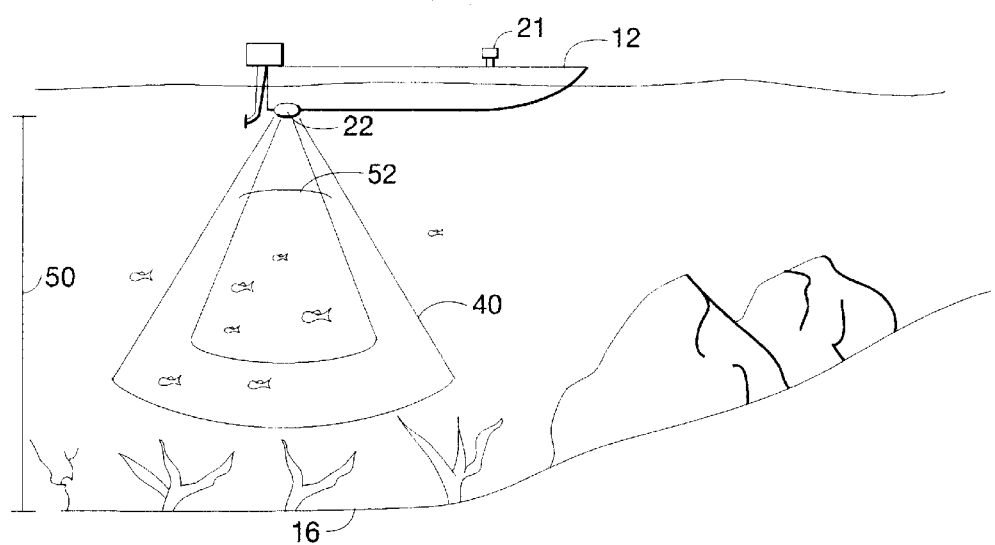
FIG. 3 is a cross-sectional view of the body of water shown in FIG. 1, to illustrate the single transmit, dual receive cycle of operation of the sonar depth detector of the present invention.

FIG. 3 shows a cross-sectional view of the body of water 10 shown in FIG. 1, to illustrate features of the present invention during operation of the sonar device 21. With additional reference to FIG. 2, the sonar device 21 transmits a wide acoustic wave beam 40 from the transducer 22. The receiver 30 begins listening for sonar returns through the transducer 22. The wide acoustic wave beam 40 propagates to the bottom surface 16 and reflects a sonar return. The transducer 22 communicates the received sonar return to the receiver 30. A prior cycle had determined the depth 50, and in the illustrated embodiment, the depth is displayed on the display 36 as well as provided to controller 32 for evaluating the duration until the switch 34 is operated. Using the prior determined depth, the controller 32 determines an approximate travel time for the wide sound energy signal 40 to reach the bottom surface 16 and return. At a predetermined proportion of the travel time, the return sonar reaches a point 52 near the transducer. The return sonar from the bottom reflection carries details about the bottom 16. The controller 32 directs the switch 34 to change the receiving mode from the wide acoustic wave beam mode to the narrow acoustic wave beam mode. The receiver 30 then uses both the ring 24 and the disk 26 for the return sonar. The sonar device 21 continues receiving in the narrow acoustic wave beam mode, until the start of the next T/R cycle. The received sonar returns are processed by the controller 32 for display of representative symbols on the display 36. The T/R cycle then repeats with the newly determined depth from the prior cycle.

The sonar device 21 of the present invention repetitively scans the body of water 10 for fish and other underwater articles with transmissions of acoustic waves and receiving and displaying the sonar returns from each transmission initially in the wide beam mode and then in the narrow beam mode, with the duration of receiving being a function of the determined depth from a prior transmission. The proportion of receiving in the wide beam mode and the narrow beam mode is fixed. The proportion of receiving in the wide beam mode is a majority of the duration of an approximate travel time (based on the prior determined depth) for the transmitted acoustic wave to propagate to the bottom and a reflected echo to return to the transducer for being received. The proportion of receiving in the wide beam mode is in a range from about 55% to about 98% of the duration of an approximate travel time for the transmitted acoustic wave to propagate to the bottom and the reflected echo to return. Preferably, the proportion of receiving in the wide beam mode is in a range of about 95% to about 98% of the travel duration based on the determined depth of the prior T/R cycle which provides an approximate travel time for the transmitted acoustic wave to propagate to the bottom and a reflected echo to return to the transducer. Changing to the narrow acoustic wave beam mode enables the sonar device 21 to receive the more detailed narrow acoustic wave beam for portions of the body of water near and at the bottom of the water. For durations in excess of 98%, sloped bottom surfaces may lose definition and detail. For shorter durations (less than 55%), the sonar device may not identify fish or articles to the sides of the vessel. Durations between about 55% and 95% provide tradeoffs in the detail and representations of articles reflecting sonar returns.

The apparatus of the present invention accordingly provides the single-transmit, dual-receive depth detector 21 with the transducer 22 for transmitting in a single transmit/receive cycle a wide acoustic wave beam and for receiving in both a narrow acoustic wave beam mode and a wide acoustic wave beam mode. The switch 34 changes the receiving mode of the transducer 22 from the initial wide acoustic wave beam mode to the narrow acoustic wave beam mode with the duration of receiving being a function of the determined depth from a prior transmission, as discussed above. A display displays the sonar returns from each transmission.

The present invention accordingly obtains wide beam information about fish arches and underwater structures while also obtaining precise details of the bottom surface in a single-transmit, dual-receive method of scanning bodies of water with a sonar device.

The principles, preferred embodiments, and modes of operation of the present invention have been described in the forgoing specifications. The invention is not to be construed as limited to the particular forms disclosed because these are regarded as illustrative rather than restrictive. Moreover, variations and changes maybe made by those skilled in the art without departing from the spirit of the invention as described by the following claims.

What is claimed is:

1. A method of scanning a body of water for fish and other underwater articles with a sonar depth finder of a type having a transducer that can transmit an acoustic wave and receive sonar returns on both a narrow acoustic wave beam mode and on a wide acoustic wave beam mode, and which comprises the steps of repetitively determining the approximate depth of the body of water by repetitively transmitting in the wide beam mode and receiving and displaying the sonar returns from each transmission initially in the wide beam mode and then in the narrow beam mode, with the duration of receiving in the narrow acoustic wave beam mode being a function of the determined depth from a prior transmission.

2. The method of claim 1, wherein the proportion of receiving in the wide beam mode and the narrow beam mode is fixed.

3. The method of claim 1, wherein the proportion of receiving in the wide beam mode is a majority of the duration of an approximate travel time for the transmitted acoustic wave to propagate to the bottom and a reflected echo thereof to return to the transducer for being received.

4. The method of claim 1, wherein the proportion of receiving in the wide beam mode is in a range from about 55% to about 98% of the duration of an approximate travel time for the transmitted acoustic wave to propagate to the bottom and a reflected echo thereof to return to the transducer for being received.

5. The method of claim 1, wherein the proportion of receiving in the wide beam mode is in a range of about 95% to about 98% of the duration of an approximate travel time for the transmitted acoustic wave to propagate to the bottom and a reflected echo thereof to return to the transducer for being received.

6. A single-transmit, dual-receive cycle sonar depth detector device, comprising:

a transducer for transmitting in a single transmit/receive cycle a wide acoustic wave beam and for receiving on both a narrow acoustic wave beam mode and a wide acoustic wave beam mode;

a switch for changing the receiving mode of the transducer from the initial wide acoustic wave beam mode to the narrow acoustic wave beam mode with the duration of receiving in the narrow acoustic wave beam mode being a function of the determined depth from a prior transmission; and a display for displaying the sonar returns from each transmission.

7. The sonar depth detector device of claim 6, wherein the switch changes to receiving in the narrow beam mode after a fixed proportion of receiving in the wide beam mode.

8. The sonar depth detector device of claim 6, wherein the switch changes to receiving in the narrow beam mode after passage of a majority of the duration of an approximate travel time for the transmitted acoustic wave to propagate to the bottom and a reflected echo thereof to return to the transducer for being received.

9. The sonar depth detector device of claim 6, wherein the switch changes to receiving in the narrow beam mode after a proportion of receiving in the wide beam mode is in a range from about 55% to about 98% of the duration of an approximate travel time for the transmitted acoustic wave to propagate to the bottom and a reflected echo thereof to return to the transducer for being received.

10. The sonar depth detector device of claim 6, wherein the switch changes to receiving in the narrow beam mode after a proportion of receiving in the wide beam mode in a range of about 95% to about 98% of the duration of an approximate travel time for the transmitted acoustic wave to propagate to the bottom and a reflected echo thereof to return to the transducer for being received.

11. A single-transmit, dual-receive cycle sonar depth detector device, comprising:

a transducer for transmitting a wide energy beam and for receiving return echoes of the wide energy beam from at least one underwater article in a wide energy beam mode and a narrow energy beam mode;

a controller for changing the transducer from receiving initially on the wide energy beam mode after transmission of the wide energy beam to receiving on the narrow energy beam mode, with the duration of receiving in the narrow acoustic wave beam mode being a function of the determined depth from a prior transmission; and a display for illustrating the detected underwater article.

* * * * *